US009793982B2

(12) United States Patent
Kummetz et al.

(10) Patent No.: US 9,793,982 B2
(45) Date of Patent: Oct. 17, 2017

(54) SYSTEM FOR AUTOMATIC CONFIGURATION OF A MOBILE COMMUNICATION SYSTEM

(75) Inventors: Thomas Kummetz, Forest, VA (US); Van Hanson, Forest, VA (US); Alfons Dussmann, Gansheim (DE)

(73) Assignee: CommScope Technologies LLC, Hickory, NC (US)

( * ) Notice: Subject to any disclaimer, the term of this patent is extended or adjusted under 35 U.S.C. 154(b) by 359 days.

(21) Appl. No.: 12/427,347

(22) Filed: Apr. 21, 2009

(65) Prior Publication Data

US 2010/0265848 A1    Oct. 21, 2010

(51) Int. Cl.
H04B 7/155    (2006.01)
H04B 7/26    (2006.01)

(52) U.S. Cl.
CPC ........... H04B 7/2606 (2013.01); H04B 7/155 (2013.01)

(58) Field of Classification Search
USPC ................ 370/310, 315, 318, 319; 455/7, 9
See application file for complete search history.

(56) References Cited

U.S. PATENT DOCUMENTS

| 3,628,147 | A | 12/1971 | Makino |
| 6,408,180 | B1 | 6/2002 | McKenna et al. |
| 6,459,881 | B1 | 10/2002 | Hoder et al. |
| 6,490,460 | B1 | 12/2002 | Soliman |
| 6,571,284 | B1* | 5/2003 | Suonvieri ................ 709/221 |
| 6,642,894 | B1 | 11/2003 | Gross et al. |
| 6,750,813 | B2 | 6/2004 | Vargas-Hurlston et al. |
| 6,785,511 | B1 | 8/2004 | Hengeveld et al. |
| 6,785,551 | B1 | 8/2004 | Richard |
| 6,792,262 | B2 | 9/2004 | Yamanaka et al. |
| 6,795,699 | B1 | 9/2004 | McCraw et al. |
| 6,904,280 | B2 | 6/2005 | Siegel |
| 6,934,511 | B1 | 8/2005 | Lovinggood et al. |

(Continued)

FOREIGN PATENT DOCUMENTS

| CN | 1518370 | 8/2004 |
| EP | 2434658 A2 | 3/2012 |

(Continued)

OTHER PUBLICATIONS

Four-page International Search Report for corresponding PCT case PCT/US2010/028457.

(Continued)

Primary Examiner — Ayaz Sheikh
Assistant Examiner — Tarell Hampton
(74) Attorney, Agent, or Firm — Fogg & Powers LLC

(57) ABSTRACT

A communication system includes a receive antenna for receiving communication signals, processing circuitry for processing the received communication signals and repeating the signals for further transmission and at least one transmit antenna for transmitting the repeated signals. The processing circuitry utilizes configurable settings for controlling the operation of the communication system and the configurable settings are variable for varying the operation of the system. The processing circuitry is further operable for receiving inputs regarding current operating conditions of the communication system and for selectively adapting the configurable settings of the system based upon the operating condition inputs.

19 Claims, 4 Drawing Sheets

(56) References Cited

U.S. PATENT DOCUMENTS

| | | | |
|---|---|---|---|
| 6,952,158 | B2 | 10/2005 | Kennedy, Jr. |
| 7,016,688 | B2 * | 3/2006 | Simic et al. ............... 455/456.1 |
| 7,020,701 | B1 | 3/2006 | Gelvin et al. |
| 7,027,919 | B2 | 4/2006 | Bernesi et al. |
| 7,302,259 | B2 | 11/2007 | Hwang |
| 7,383,043 | B2 | 6/2008 | Lee |
| 7,383,049 | B2 | 6/2008 | Deloach, Jr. et al. |
| 7,457,584 | B2 | 11/2008 | Baker et al. |
| 7,466,975 | B2 | 12/2008 | Feher |
| 7,522,918 | B2 | 4/2009 | Wachter et al. |
| 7,580,381 | B2 | 8/2009 | Michelon et al. |
| 7,583,940 | B2 | 9/2009 | Matsuura et al. |
| 7,593,688 | B2 | 9/2009 | Pratt et al. |
| 7,610,050 | B2 | 10/2009 | Sayers et al. |
| 7,626,960 | B2 | 12/2009 | Muller |
| 7,738,836 | B2 | 6/2010 | Alles et al. |
| 7,742,448 | B2 | 6/2010 | Ramachandran et al. |
| 7,831,263 | B2 | 11/2010 | Sheynblat et al. |
| 7,860,516 | B2 * | 12/2010 | Hodges .................. H04W 8/22 455/456.1 |
| 8,121,535 | B2 | 2/2012 | Proctor, Jr. et al. |
| 8,577,283 | B2 * | 11/2013 | Dean et al. ...................... 455/10 |
| 8,699,943 | B2 | 4/2014 | Kummetz et al. |
| 8,849,190 | B2 | 9/2014 | Hanson et al. |
| 2001/0041568 | A1 * | 11/2001 | Hughes et al. ............... 455/434 |
| 2002/0045461 | A1 | 4/2002 | Bongfeldt |
| 2002/0068574 | A1 | 6/2002 | Vestergaard et al. |
| 2002/0077144 | A1 | 6/2002 | Keller et al. |
| 2003/0157943 | A1 * | 8/2003 | Sabat, Jr. ...................... 455/456 |
| 2004/0152462 | A1 * | 8/2004 | Hwang ...................... 455/432.1 |
| 2005/0130588 | A1 * | 6/2005 | Pratt et al. .................... 455/11.1 |
| 2005/0232223 | A1 | 10/2005 | Muller |
| 2005/0237329 | A1 * | 10/2005 | Rubinstein et al. .......... 345/531 |
| 2006/0287824 | A1 | 12/2006 | Lin |
| 2007/0015462 | A1 | 1/2007 | Dean et al. |
| 2007/0129032 | A1 * | 6/2007 | Matsuura et al. ......... 455/127.2 |
| 2008/0107076 | A1 * | 5/2008 | Ramachandran et al. .... 370/331 |
| 2008/0181174 | A1 * | 7/2008 | Cho .............................. 370/329 |
| 2009/0186632 | A1 | 7/2009 | Kennedy, Jr. et al. |
| 2010/0081458 | A1 | 4/2010 | Sheynblat et al. |
| 2010/0118805 | A1 * | 5/2010 | Ishii et al. .................... 370/329 |
| 2010/0232345 | A1 | 9/2010 | Tsai et al. |
| 2010/0234071 | A1 | 9/2010 | Shabtay et al. |
| 2010/0265842 | A1 | 10/2010 | Khandekar et al. |
| 2010/0265848 | A1 | 10/2010 | Kummetz et al. |
| 2010/0297397 | A1 | 11/2010 | Chen |
| 2011/0009056 | A1 | 1/2011 | Hanson et al. |
| 2017/0094634 | A1 | 3/2017 | Kummetz et al. |

FOREIGN PATENT DOCUMENTS

| | | |
|---|---|---|
| JP | 2011019066 A | 1/2011 |
| RU | 2387095 | 4/2010 |
| SE | 519389 | 2/2003 |
| WO | WO9829962 | 7/1998 |
| WO | 2007008572 | 1/2007 |
| WO | WO2008040972 | 4/2008 |
| WO | 2010123645 A1 | 10/2010 |

OTHER PUBLICATIONS

Chinese Patent Office, "Fourth Office Action for CN Application No. 201080026241.3", "from Foreign Counterpart to U.S. Appl. No. 12/427,347", Dec. 30, 2015, pp. 1-17, Published in: CN.

European Patent Office, "Communication pursuant to Article 94(3) for EP Application No. 10711315.1", "from Foreign Counterpart to U.S. Appl. No. 12/427,347", Feb. 10, 2016, pp. 1-6, Published in: EP.

China Patent Office, "Office Action for CN Patent Application No. 201080026241.3", "from Foreign Counterpart to U.S. Appl. No. 12/427,347", dated Jun. 14, 2016, pp. 1-25, Published in: CN.

China Patent Office, "First Office Action from CN Application No. 201080026241.3", "from U.S. Appl. No. 12/427,347", dated Nov. 27, 2013, pp. 1-21, Published in: CN.

China Patent Office, "Second Office Action for CN Application No. 201080026241.3", "from Foreign Counterpart to U.S. Appl. No. 12/427,347", dated Sep. 3, 2014, pp. 1-8, Published in: CN.

China Patent Office, "Third Office Action for CN Application No. 201080026241.3", "from Foreign Counterpart to U.S. Appl. No. 12/427,347", dated Apr. 29, 2015, pp. 1-15, Published in: CN.

State Intellectual Property Office of the People's Republic of China, "Notification of the Reexamination for Application 201080026241. 3", "from U.S. Appl. No. 12/427,347", dated Dec. 29 2016, pp. 1-17, Published in: CN.

United States Patent and Trademark Office, "Office Action", "from U.S. Appl. No. 15/377,774", dated Jan. 30, 2017, pp. 1-43, Published in: US.

U.S. Patent Office, "Notice of Allowance", "from U.S. Appl. No. 15/377,774", dated Aug. 21, 2017, pp. 1-20, Published in: US.

Brazil Patent Office, "Office Action from BR Application No. PI1009365-6 dated Aug. 8, 2017", "from Foreign Counterpart of U.S. Appl. No. 12/427,347", dated Aug. 8, 2017, p. 1, Published in: BR.

* cited by examiner

SYSTEM FOR AUTOMATIC CONFIGURATION OF A MOBILE COMMUNICATION SYSTEM

FIELD OF THE INVENTION

The invention relates to mobile communication systems, such as repeaters and distributed antenna systems generally and, more specifically, to a mobile communication system that operates in an environment having changing conditions and changing locations.

BACKGROUND OF THE INVENTION

Repeaters, distributed antenna systems, and similar systems are communications systems that are used to extend coverage into areas where the RF penetration from base stations (BTS) is limited or not present. Those areas might be inside buildings, in tunnels, shadowed areas that are behind mountains, underground train systems, and various other isolated areas. Generally, applications for such communications systems are for situations where the repeater or distributed antenna system is immobile and is mounted in a location. That is, it is a fixed installation. In other applications, the area that has limited signal penetration of the RF signals is mobile. That is, the repeater or distributed antenna system is mobile and is installed in a moving or mobile system such as a train, a ship, a car, a bus or an airplane.

A configuration for a mobile communication system, such as a repeater or a distributed antenna system (DAS system) typically has various configuration parameters or operational settings that include, for example, filter definitions (Start and Stop frequency or center frequency and bandwidth, filter type), gain settings and/or set power level settings for each filter section, modem or communication settings, and general operational settings (On/Off).

In mobile applications, the areas that the moving system is travelling through might not allow the system to keep the same configuration or configuration parameters for proper operation. For example, as a vehicle, such as a train or bus, moves from one cellular coverage area to another, the established frequency subbands and standards available for network communication may change. Various other operational conditions may change as well. It would be desirable for a mobile communication system or other mobile RF transmission system to accommodate these changes.

SUMMARY OF THE INVENTION

An adaptive system or method provides selective adaptation or variation of a communication system's operational configuration to automatically adapt to changing details within its environment. A controller associated with the communication system determines operational and environmental conditions from a variety of factors and inputs. The controller sets the repeater to an operational configuration appropriate to the determined operational and environmental conditions.

DETAILED DESCRIPTION

The examples disclosed herein of an adaptive communication system in a mobile environment are exemplary of the invention and do not limit the scope of the invention. One skilled in the art will recognize a variety of applications and embodiments of the invention from the disclosure herein. Illustration and discussion are for an exemplary repeater but the system might also be a distributed antenna system, or some other system that transceives and/or repeats communication signals between a signal source (e.g., a base station) and mobile equipment (e.g., a cell phone).

Figure 1:
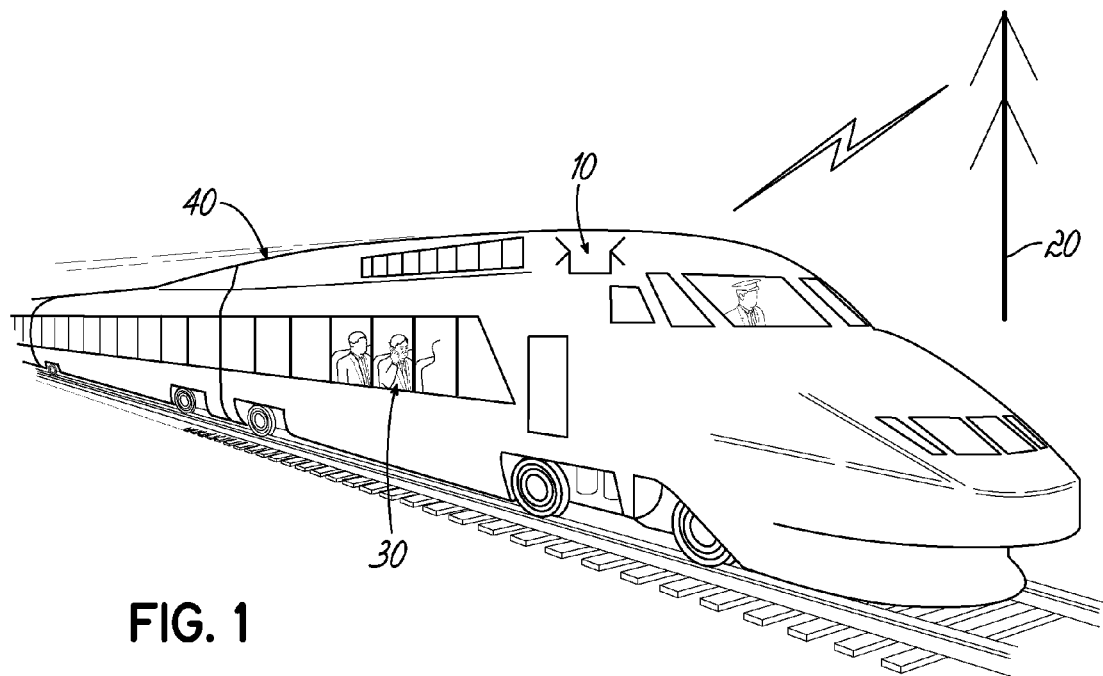
FIG. 1 illustrates a repeater system for use in a mobile environment in accordance with aspects of the invention.

FIG. 1 shows an exemplary mobile communication system 10 that acts as part of a mobile communication network by facilitating communication between one or more base stations 20 and one or more mobile devices 30 that are in use in a mobile platform or moving environment, such as on a train 40. Although the exemplary adaptive communication system 10 is shown on a train 40, the system may be disposed in any other appropriate mobile environment, such as in a plane, ship, or automotive vehicle. The invention's use is not limited to the disclosed examples.

Figure 2:
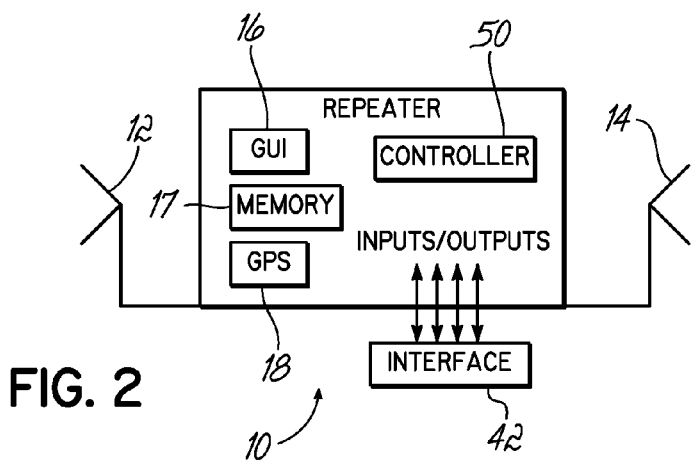
FIG. 2 is a diagram illustrating the components in an exemplary repeater according to the invention.
Figure 2A:
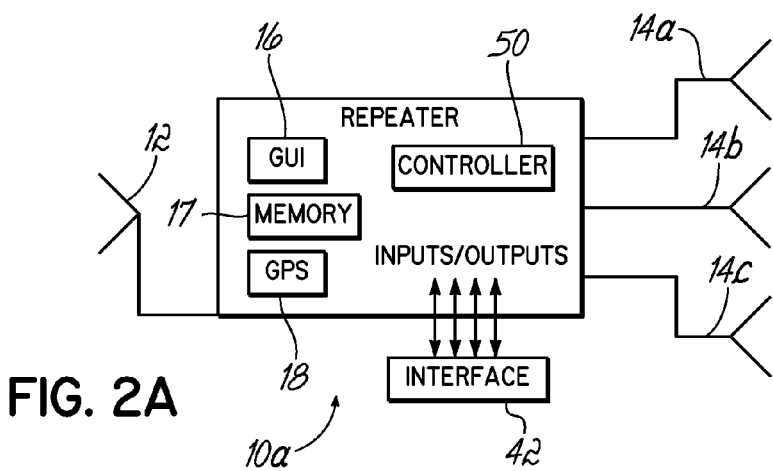
FIG. 2A is a diagram illustrating the components in an exemplary distributed antenna system according to the invention.

FIG. 2 shows a schematic view of one embodiment of an adaptive mobile repeater 10. A donor antenna 12 transmits and receives (or transceives) signals with one or more base stations 20. A coverage antenna 14 transceives signals with one or more mobile devices 30. Within the repeater 10, a processor/controller 50 receives information about the mobile environment and uses this information to maintain or selectively vary or adapt the configurable repeater settings of the adaptive repeater. The controller may be linked to various external devices or sources using appropriate interfaces 42 for providing the system with the information it needs to adapt. On-board measurement devices 18, such as a GPS, clocks, or speedometers, for example, send data to the controller 50 using appropriate interfaces. Additionally, other external devices/sources using interfaces 42, such as devices/systems associated with the mobile vehicle, also contribute to the controller 50. System 10 has appropriate interface circuitry for such inputs/outputs. The interfaces provide information regarding current operating conditions of the repeater. System 10 has appropriate memory and/or may access external memory, such as through other appropriate inputs. A graphical user interface (GUI) 16 may also be used to allow a user to input and output data and for other user control of the adaptive repeater settings. FIG. 2A illustrates another possible embodiment for the invention, including a distributed antenna system 10a that has multiple distribution or transmission antennas 14a, 14b, 14c with other similar elements having similar reference numerals as in FIG. 2.

Information about the repeater environment and operating conditions that may be handled by interface 42 may include, for example, the repeater's geographical location, the properties of the mobile network that it links to or "sees", properties of received signals, the location and properties of base stations that interface with the repeater, and details about the local mobile environment in which the repeater is situated or moving. This list of exemplary conditions and information is not exhaustive; other information may be available for use in configuring the systems 10, 10a.

Furthermore, various types of information might be used to adapt the system of the invention. That is, different inputs might reflect the current operating conditions (e.g., location, network properties, signal properties, etc.) and might be used in various combinations to adapt the system.

Location Information

As one set of inputs through interface 42, a mobile communication system may receive coordinate information indicating the system's geographical location. The repeater may collect these location coordinates directly, such as through its on-board positioning system such as satellite references (GPS) or terrestrial signals (LORAN). Alternatively, the system and controller 50 may be fed location coordinates through another connected system. For example, a positioning system on board a vehicle may be in communication with a central system that controls routing and scheduling information for the vehicle or mobile platform, such as train 40. The central system then conveys coordinates directly to the adaptive communication system 10 or to other equipment on board the vehicle that is then fed to the adaptive repeater.

A base station 20 may also communicate its location (either its absolute position or its location relative to the repeater), using coordinate signals such as GPS coordinates transmitted by a BTS. For example, a CDMA system base station sends location coordinates. Those location coordinates may then be used and compared against a list of coordinates. The base station might also provide its transmitting and receiving frequency bands, its network configuration, information about neighboring base stations, and other relevant information. This information may also be used to adapt the repeater system of the invention. This information may be conveyed by a broadcast control channel associated with a base station, for example.

Location information may also be arrived at indirectly through the use of other received data. For example, data that identifies the origin of a network or signal, information about the location of a base station, vehicle itinerary information, or even user-input location information may be used to determine location for the purpose of selectively adapting the repeater system to vary its operation. Therefore, the location of the mobile system, the location of the network and base stations or both might be used for selectively adapting the mobile system of the invention.

Network Properties

In another embodiment of the invention, properties of a network that the repeater interfaces with may be directly communicated to the repeater as an operating condition for the purpose of adapting the repeater system. Base stations may transmit various system information elements that are used by controller 50 to identify the base station. In the case of a GSM network, the codes received may include a mobile country code (MCC), mobile network code (MNC), cell identity code (CI), location area code (LAC), network color code (NCC), or a base station color code (BCC). These various system codes are used for GSM/UMTS networks. If another network, such as a CDMA network, is in use, other different codes may be transmitted by a base station. A base station may transmit other identifying network signals associated with the properties of the network so that the repeater knows its current operating conditions. The repeater or other system then adapts to operate properly in the proximate network. Such network codes may be applicable to one frequency group, which represents an operator's frequency subbands within one RF band.

Properties of a network can also be determined through the use of other data inputs. Where network properties are tied to a physical location, a repeater may be able to use its location or the location of a proximate base station to arrive at information about a network.

Signal Properties

Additionally, the presence and strength of a signal in certain frequency band and subband ranges may indicate certain network properties and certain operating conditions. A repeater may be able to directly measure the signal frequency band, signal strength, or degree of signal distortion. Signal properties may also be communicated to the repeater through other inputs.

For example, the signal level of the received signal strength indicator (RSSI) or the signal level of a decoded signal, (a broadcast or beacon channel (BCCH) for GSM or a pilot signal) within a particular operator's frequency subband, might be monitored to determine current operating conditions. For example, looking at the RSSI level at a certain frequency may indicate a particular location of the repeater or that certain frequencies exist in certain areas. If the inputs to interface 42 of the repeater system 10 detect energy in a certain frequency range, the repeater system might be adapted for that particular scenario. Therefore, signal conditions and properties of the signals detected by the repeater may be used to reflect current operating conditions and used to therefore adapt the repeater system according to the invention.

Environmental Details

Relevant details of the local mobile environment may also be used for selective adaptation according to the invention. They might include speed, ambient temperature, lightning conditions, time of day, wireless network traffic load/congestions, the presence of obstacles to RF transmission (e.g., presence in a building or tunnel), and logistical information (such as whether a vehicle currently has passengers). A repeater may be set up to measure one or more local details or conditions directly (such as an on-board motion detector, light meter, or clock). Alternatively, local conditions may be received from an outside input through interface 42, such as a vehicle controller. Local conditions may also be derived from other data, such as the use of GPS data over time to determine speed, for example.

In accordance with one aspect of the invention, specific input signal sets or data sets reflective of different operating conditions, and the knowledge of such conditions are used to configure the repeater or other communication system automatically to accommodate the conditions. The conditions might be determined using one or more of the inputs through interface 42 noted above. Also, while one or more inputs might indicate a certain condition, such as location of the repeater, one or more additional inputs might be used to verify the condition. Such conditions might include for example:

Condition 1—Location within Cartographic Boundary1 (shape of Switzerland)
Condition 2—Location within Cartographic Boundary 2 (boundary of bigger city frequency planning zone)
Condition 3—Speed above 200 km/h (the repeater needs to follow RSSI changes using a quick mode)
Condition 4—Speed below 2 km/h (the repeater is most likely not in movement)
Condition 5—MCC is part of list {228} (repeater is located with the reach of a BTS of Switzerland)

Condition 6—MNC is part of list {01,02,03,04,05,06,07, 08,50,51}

Condition 7—Time is between 6 am and 11 pm (train hours of operation)

In one embodiment, the export, import, and the display or viewing of the operating conditions, such as the cartographic boundary files, is accessible through the GUI 16 associated with the adaptive repeater 10. In determining the existence of certain operating conditions, the processor 50 of repeater system 10 provides verification and error checking. For example, there may be a check performed on whether a particular number is within an allowed range or whether a cartographic boundary file constitutes an unsegmented area. Where a cartographic boundary is used in conjunction with the GUI 16, a cartographic boundary may be used in conjunction with a map file as a background for orientation purposes.

Based on one or more inputs or other data through interface 42 that reflect current operating conditions of the system, the system adapts its operation or changes its configuration to adapt to the new conditions. That is, certain condition inputs/data and sets of inputs or conditions result in a change in the configuration of the repeater system. Generally, in one embodiment, the adaptation is automatic upon the sensing of a change in the operating conditions of the system. The controller 50 may affect such adaptation or change in the system by adapting one or more of the various configurable settings of the system. Certain configuration changes or configurable settings may include, for example:

Setting the system or repeater filter to reflect certain bands and subbands and the filter type.

Setting the system or repeater gain values (or the power level) for different frequency subbands/filter sections.

Configuring the transmission properties, including network details of the system.

Activating or deactivating certain system or repeater functions, including signal transmission.

Entering specialized modes, such as the use of a fast gain tracking algorithm using RSSI or pilot data at higher speeds Other configurable settings might be changed and the present invention is not limited to one or more particular settings. There are multiple ways to implement the use of condition inputs and data to adaptively configure the repeater or other system. In one embodiment, each configuration file that may be selected includes a complete list of the configurable settings or parameters for the repeater system. In another embodiment, one or more selectable configuration files may include only a subset of the configurable settings or parameters. In such a subset case, the repeater system may revert to default settings and parameters for those settings not included specifically in the configuration file. Alternatively, the repeater may leave settings that are not included in an implemented configuration file in the same condition as they were in before the new configuration file was implemented and the system was adapted. That is, only some of the settings or parameters might be adapted while other settings might remain the same or change to a default condition.

A condition set for causing adaptation may include a single condition or multiple conditions. Multiple conditions may be arranged in a logical argument fashion for selective adaptation. For some condition sets, satisfying at least one condition may satisfy the entire condition set (such as a logical "OR" series). For other condition sets, satisfying the condition set may require satisfying every condition in the set (such as a logical "AND" series). Other condition sets may be satisfied by other logical combinations of conditions as will be understood by a person of ordinary skill in the art, such as, for example, some OR conditions combined with one or more AND conditions. To that end, the processor may implement a series of condition sets in a particular order to determine when and how to adapt or configure the repeater. As will be understood by a person of ordinary skill in the art, the invention is not limited to particular sets of conditions or the order such sets and conditions are utilized for the purpose of adaptation.

Figure 3A:
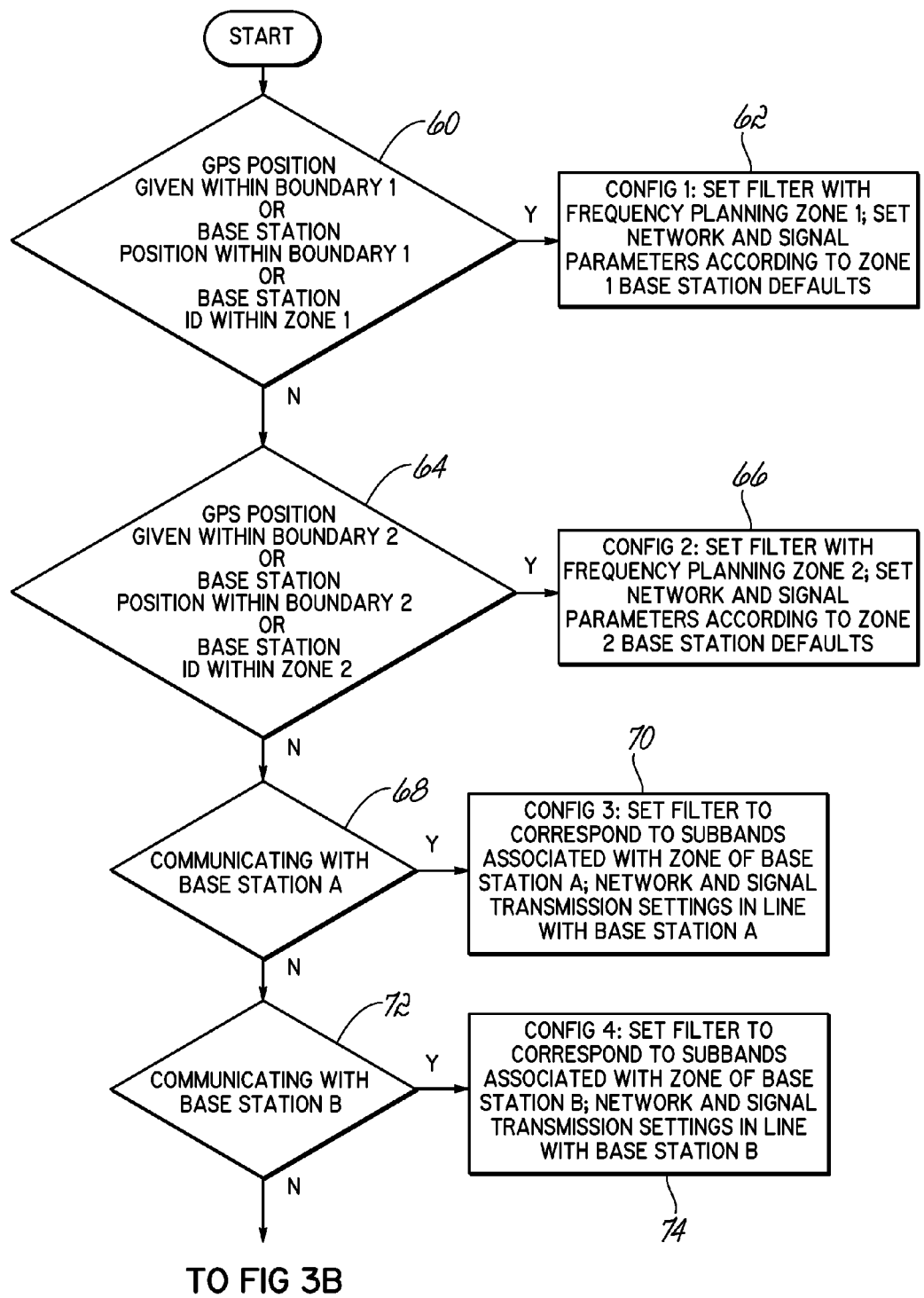
FIGS. 3A and 3B are a flowchart illustrating an exemplary process for selectively varying or adapting repeater configuration according to the invention.
Figure 3B:
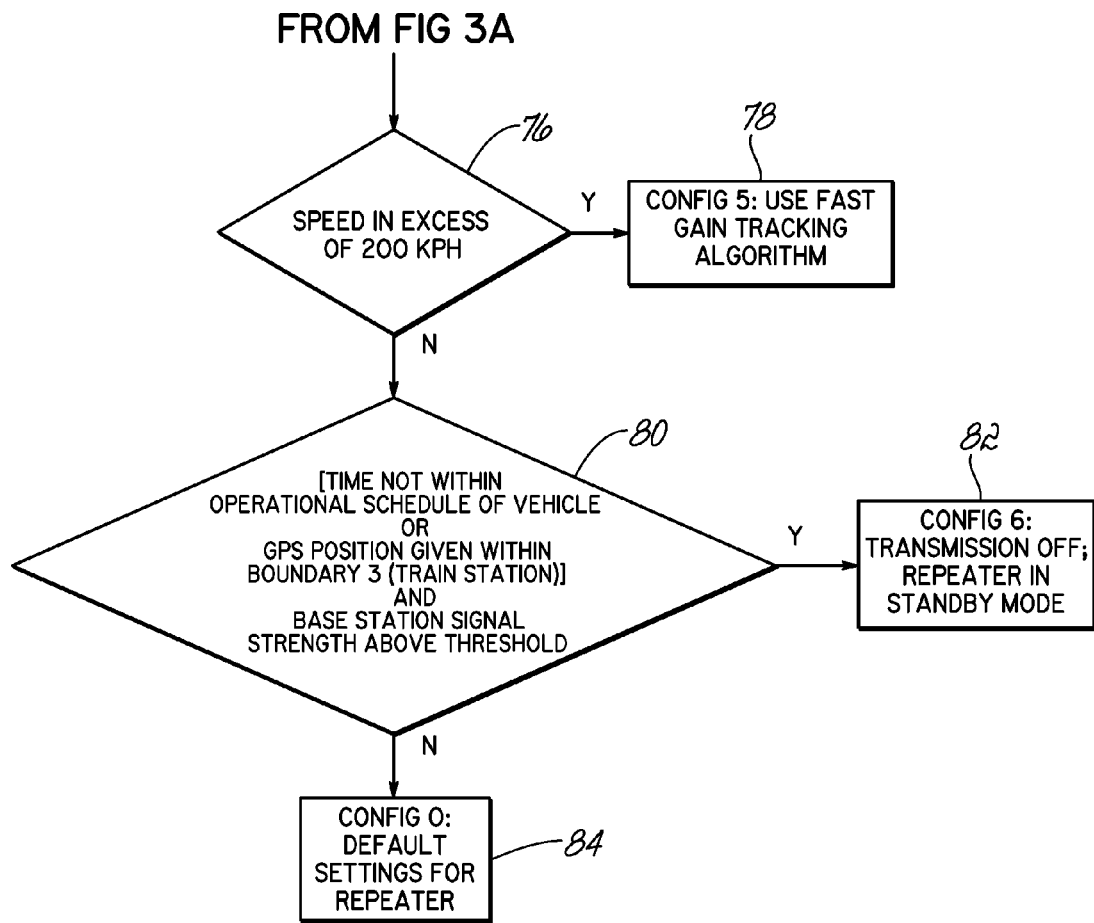

FIGS. 3A and 3B illustrate an exemplary method for processing a series of condition sets and implementing an operational configuration according to the present conditions as detected by inputs to interface 42 of the repeater system. As shown, the method includes different condition sets associated with a location within specific frequency planning zones, communication with specific base stations, a mobile vehicle moving at high travel speeds, and conditions where the repeater does not need to transmit. The method illustrated in FIGS. 3A and 3B is only one exemplary logic process and does not limit the scope of the invention. A variety of different conditions may result in a variety of different configurations. A variety of logic operators, inputs, and evaluative criteria may be used to determine which configuration or configurations to use.

In the FIGS. 3A-3B and the table below, various logical criteria are set forth for adapting or configuring the repeater system in accordance with the invention. For example, in block 60, conditions may be tested to determine the location of the mobile communication system and the mobile environment and/or the position or location of the base station that the mobile system is currently communicating with. For example, GPS coordinates for the mobile platform (e.g., a moving train) may indicate the repeater system is in a particular cartographic boundary (e.g., boundary 1, or a country or state). Or, a GPS input for the coordinates of the base station may indicate that the repeater system is interfacing with a base station located within a cartographic boundary 1 (for example, the shape or country of Switzerland). Alternatively, as shown in block 60, the base station ID, which may be reflected in the particular mobile country code (MCC=228), or a mobile network code (MNC is found in the list 01, 02, 03, 04, 05, 06, 07, 08, 50, 51) may indicate that the base station is within a defined zone (i.e., zone 1). If at least one of such conditions is met affirmatively, then the repeater system might be adapted or configured with the configurable settings of configuration 1, as indicated by block 62 in FIG. 3A. That is, configuration 1 is selected based upon the inputs/data regarding operating conditions. The one or more configurable settings associated with the configuration are used to adapt the system. That is, the filters might be set with respect to a particular frequency planning zone 1. Also, the network and signal parameters might be set according to zone 1 base station defaults.

Alternatively, if the conditions from the condition set reflected in block 60 are not met, a further test might be made to determine whether the conditions from another condition set are met, such as from the condition set indicated by block 64. As illustrated, current operating conditions and inputs might be evaluated to determine if the repeater system is operating in a different boundary or zone. If so, the repeater system might be configured or adapted according to the settings of the configuration 2 set forth in block 66. That is, configuration 2 is selected. Alternatively, as indicated by blocks 68 and 72, the data through the interface 42 to the repeater system might be processed, and thereby indicate that the current operating conditions show that the repeater is currently communicating with a particular base station (e.g., base station A, base station B). If the repeater system is communicating with base station A, configuration 3 might be utilized as set forth in block 70 of FIG. 3A. Alternatively, configuration 4 might be utilized as set forth in block 74, when the computer system is communicating with base station B. As noted above, various base station information, such as network ID codes, base station coordinates, signal properties, and other input/data information, might be utilized to determine the identity of a particular base station communicating with the repeater system.

If previous condition sets are not met based upon evaluation of the operating conditions, still other conditions, such as environmental conditions, might also be monitored. For example, as in block 76 shown in FIG. 3B, information regarding the speed of the mobile system might be determined. For example, if the speed of the vehicle housing the repeater is in excess of 200 km/hour as indicate by block 76, configuration 5 might be utilized, as shown in block 78, so that the repeater system may use fast gain tracking algorithms for proper interfacing with a base station. Still other conditions might be tested, as shown in block 80. For example, the location of the mobile repeater platform, such as the operation or movement of the vehicle housing the repeater might be determined. For example, if the current time does not indicate operation of the vehicle according to an operational schedule, or if a GPS positioning indicates that the vehicle is within the boundary of a stationery location such as a train station, and the base station signal strength is above a threshold, configuration 6 might be utilized as shown by block 82 in FIG. 3B. In that case, the uplink gain might be reduced to 0 dB, and the transmission turned OFF, and the repeater placed in standby mode.

If none of the various condition sets are met, a default configuration, or configuration 0 might be used as shown in block 84 to set the default settings for the repeater.

the condition sets, the sets themselves, and configuration files used for adaptation to adapt the configurable settings of the mobile system. Alternatively, the repeater 10 may receive condition sets and configuration files input by a centralized controller or other external source or device. Condition sets and configurations and configuration files are easily edited or changed, such as through the GUI, to suit the mobile environment in which the repeater operates. The configuration files contain information or data regarding at least one of the configurable settings for the repeater system.

In one embodiment, the configuration or adaptation could be set entirely by the determined location of the repeater 10. The logic control in that case could include multiple levels of configuration for different location conditions. Within the vicinity of a specific coordinate (such as a train station, harbor, base station, tunnel, airport, bus station, or the like), a configuration specific to that location is used. For example, if the repeater is at coordinates xy1, use configuration 100, or if it is at coordinates xy2, use configuration 200. Outside of such specific points but within a zone defining a particular region (such as a metropolitan area), a region-specific configuration is used. For example, in a zone defining a city or metropolitan area, different configurations are used. Outside of a region but within a country or state, a configuration appropriate to that country or state might be used. Outside of any defined cartographic boundary, a default configuration is used. In that way, multiple levels of geographic zones are use. Any appropriate logic set can be used to match configurations to any appropriate set of determined conditions and controller 50 may be configured in that way.

Conditions, condition sets, and related configuration files may be stored in memory in any appropriate format. The memory might exist as memory 17 on the system or might be external and accessed by the system by an appropriate interface. In one embodiment, condition sets may be stored and processed as XML files. Configuration sets or files for

| Condition | Configuration |
|---|---|
| GPS position given within boundary 1 OR base station position within boundary 1 OR base station ID within zone 1 | Config1: Set filter to correspond to subbands associated with frequency planning zone 1; set network and signal parameters according to zone 1 base station defaults |
| GPS position given within boundary 2 OR base station position within boundary 2 OR base station ID within zone 2 | Config2: Set filter to correspond to subbands associated with frequency planning zone 2; set network and signal parameters according to zone 2 base station defaults |
| Communicating with Base Station A | Config3: Set filter to correspond to subbands associated with zone of Base Station A; network and signal transmission settings in line with Base Station A |
| Communicating with Base Station B | Config4: Set filter to correspond to subbands associated with zone of Base Station B; network and signal transmission settings in line with Base Station B |
| Speed in excess of 200 kph | Config5: Use fast gain tracking algorithm |
| [Time not within operation schedule of vehicle OR GPS position given within boundary 3 (train station)] AND base station signal strength above threshold | Config6: Transmission off; repeater in standby mode |
| None of the above | Config0: Default settings for repeater |

In one embodiment, the GUI 16 of the repeater 10 is operable to enter, view, and modify both the conditions of use for use in the invention may be generated externally with some specific editor. Then, upon certain conditions or condition sets being met, as determined by the inputs to interface 42 and processor 50, a particular configuration set or configuration file might be selected. The configurable settings are then selected according to that configuration or configuration file. The repeater system 10 might be set up or configured for a particular set of conditions. That configuration set may then be stored under a particular file name and then subsequently accessed upon the need to adapt the repeater system based on current operating conditions. The various export, import, and display of the various configuration sets and files may be implemented utilizing the GUI. Cartographic boundary information may also be stored and evaluated using a geographic shape file. For example, a shape file such as the ASCII format file on the census.gov website might be used. Other formats, such as the formats offered by common GIS (geographic information system) software might be used. Shape files are also available, as would be understood by a person of ordinary skill in the art, and can be utilized in embodiments of the invention.

The repeater system 10 and processor 50 might also be configured so that the repeater system logs each configuration as it is used, with each log entry including the time and date (time-stamp), the configuration in use, and the conditions that triggered the use of that configuration, such as the geographical position that caused the adaptation. A person of ordinary skill in the art in the use of mobile devices will appreciate the addition of a variety of functional features that follow from the present disclosure.

Figure 4:
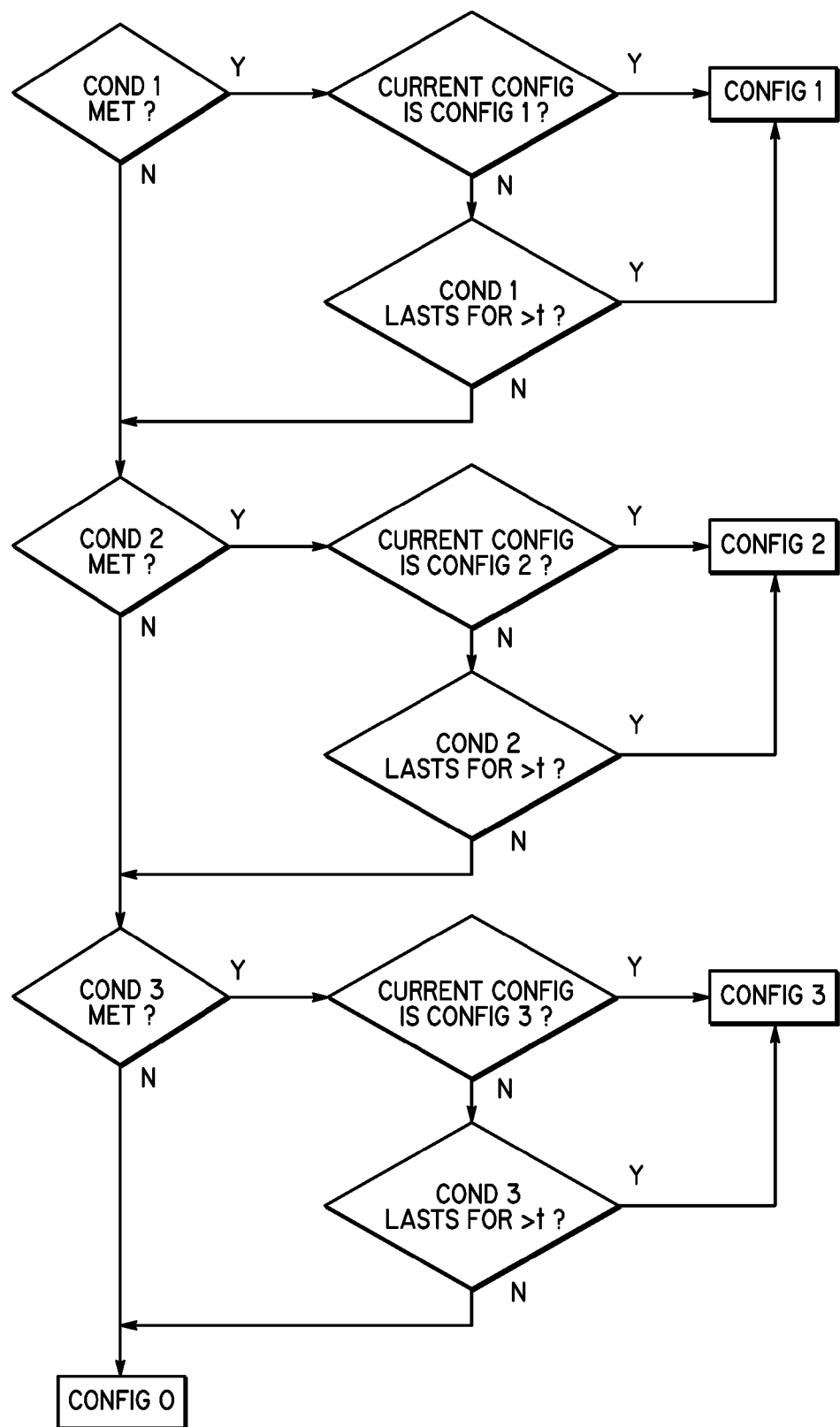
FIG. 4 is a flowchart illustrating another exemplary process for selectively varying or adapting a repeater configuration including a hysteresis provision according to the invention.

The logic used by the controller 50 to determine when to alter the repeater configuration may include a hysteresis loop or other programming to reduce or prevent oscillation between configurations when the system is near a condition boundary. Hysteresis may include, for example, a minimum time spent in each configuration before the configuration can be changed. FIG. 4 illustrates the addition of a logic step in the control process that requires that a new operating condition be met consistently for a period of time before the configuration of the repeater will change.

Although the disclosure herein discusses use of the invention with regard to a repeater, these same methods can be applied to base stations, distributed antenna systems, and other types of RF transceivers and communication systems that operate in mobile environments.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A mobile communication system for repeating communication signals comprising:
    at least one receive antenna for receiving communication signals;
    processing circuitry for processing the received communication signals and repeating the signals for further transmission;
    at least one transmit antenna for transmitting the repeated signals;
    a plurality of selectable and defined configurations stored in a memory, the configurations each including a set of configurable settings for controlling the operation of the processing circuitry;
    a plurality of defined cartographic boundaries stored in memory, the plurality of cartographic boundaries including multiple levels of geographic zones of different sizes, a configuration from the plurality of configurations being associated with a respective geographic zone and at least one of the geographic zones associated with a stationary site within which the mobile communication system may become stationary;
    the processing circuitry further configured for utilizing at least one of the configurations and the respective set of configurable settings of the configuration for controlling the operation of the mobile communication system as it moves through a mobile environment;
    the processing circuitry further operable for receiving, over time, a plurality of inputs regarding a plurality of current operating conditions of the mobile communication system, wherein the operating condition inputs include at least one input representing a current geographical location of the moving mobile communication system;
    the configurations and respective sets of configurable settings being associated with a respective geographic zone in the multiple levels and the processing circuitry configured for using the plurality of current operating condition inputs and evaluating the inputs to determine the specific level and geographic zone that a current geographical location of the mobile communication system falls within, the processing circuitry configured for automatically selecting a configuration that is associated with the determined specific level and geographic zone and selectively adapting the operation of the system to the selected configuration based upon the current operating conditions or if the determined geographic zone is associated with the stationary site, selecting a standby configuration for the system;
    wherein the plurality of inputs regarding a plurality of current operating conditions additionally includes at least one input directed to the identification of at least on base station that is currently communicating with the mobile communication system;
    wherein the at least one input directed to the identification of at least one base station that is communicating with the mobile communication system includes information regarding at least one of: the location of the base station, a network property associated with the base station, and a signal property associated with the base station.

2. The mobile communication system of claim 1 wherein the selective adaptation includes adapting the operation of the system with some of the configurable settings of the selected configuration and leaving at least one of the configurable settings of the system unchanged.

3. The mobile communication system of claim 1 wherein the selective adaptation includes adapting the operation of the system with some of the configurable settings of the selected configuration and setting at least one of the configurable settings of the system to a default setting.

4. The mobile communication system of claim 1 wherein at least one operating condition defines a condition of the system, the processing circuitry selecting a configuration and selectively adapting the operation of the system to the selected configuration when the at least one input indicates that the condition is met.

5. The mobile communication system of claim 1 wherein a plurality of operating conditions define a condition set of the system, the processing circuitry selecting a configuration and selectively adapting the operation of the mobile communication system to the selected configuration when the condition set is satisfied.

6. The mobile communication system of claim 5 wherein the condition set is stored in memory.

7. The mobile communication system of claim 1 wherein the plurality of inputs regarding a plurality of current operating conditions additionally includes at least one input directed to the identification of at least one network that is currently communicating with the mobile communication system.

8. The mobile communication system of claim 1 wherein the plurality of inputs regarding a plurality of current operating conditions additionally includes at least one input directed to environmental details of the mobile communication system.

9. The mobile communication system of claim 8 wherein the at least one input directed to environmental details of the mobile communication system includes information regarding at least one of: the speed of a mobile platform containing the system, ambient temperature, time of day, traffic conditions on the system, the presence of obstacles to radio frequency transmission, and logistical information regarding a mobile platform containing the mobile communication system.

10. The mobile communication system of claim 1 wherein the mobile communication system is a repeater.

11. The mobile communication system of claim 1 wherein the mobile communication system is a distributed antenna system.

12. A method of repeating communication signals in a mobile environment comprising:
receiving communication signals with a mobile communication system;
processing the received communication signals and repeating the signals for further transmission;
transmitting the repeated signals with the mobile communication system;
having stored in memory, a plurality of configurations, the configurations each including a set of configurable settings for controlling the operation of the processing of the communication signals;
having stored in memory, a plurality of defined cartographic boundaries, the plurality of cartographic boundaries including multiple levels of geographic zones of different sizes, a configuration from the plurality of configurations being associated with a respective geographic zone and at least one of the geographic zones associated with a stationary site within which the mobile communication system may become stationary;
utilizing at least one of the configurations and the respective set of configurable settings of the configuration for controlling the operation of the mobile communication system as it moves through the mobile environment;
receiving, over time, a plurality of inputs regarding a plurality of current operating conditions of the mobile communication system, wherein the operating condition inputs include at least one input representing a current geographical location of the moving mobile communication system;
the configurations and respective sets of configurable settings being associated with a respective geographic zone in the multiple levels and further including using the plurality of current operating condition inputs and evaluating the inputs to determine the specific level and geographic zone that a current geographical location of the mobile communication system falls within and automatically selecting a configuration that is associated with the determined specific level and geographic zone and selectively adapting the operation of the system to the selected configuration based upon the current operating conditions or if the determined geographic zone is associated with the stationary site, selecting a standby configuration for the system;
wherein the plurality of inputs regarding a plurality of current operating conditions additionally includes at least one input directed to the identification of at least one base station that is currently communicating with the mobile communication system;
wherein the at least one input directed to the identification of at least one base station that is communicating with the mobile communication system includes information regarding at least one of: the location of the base station, a network property associated with the base station, and a signal property associated with the base station.

13. The method of claim 12 wherein the selective adaptation includes adapting the operation of the system with some of the configurable settings of the selected configuration and leaving at least one of the configurable settings of the system unchanged.

14. The method of claim 12 wherein the selective adaptation includes adapting the operation of the system with some of the configurable settings of the selected configuration and setting at least one of the configurable settings of the system to a default setting.

15. The method of claim 12 wherein the at least one operating condition defines a condition of the system and further comprising selecting a configuration and selectively adapting the operation of the system when the at least one input indicates that the condition is met.

16. The method of claim 12 wherein a plurality of operating conditions define a condition set of the system and further comprising selecting a configuration and selectively adapting the operation of the mobile communication system to the selected configuration when the condition set is satisfied.

17. The method of claim 12 wherein the plurality of inputs regarding a plurality of current operating conditions additionally includes at least one input directed to the identification of at least one network that is currently communicating with the mobile communication system.

18. The method of claim 12 wherein the plurality of inputs regarding a plurality of current operating conditions additionally includes at least one input directed to environmental details of the mobile communication system.

19. The method of claim 18 wherein the at least one input directed to environmental details of the mobile communication system includes information regarding at least one of: the speed of a mobile platform containing the system, ambient temperature, time of day, traffic conditions on the system, the presence of obstacles to radio frequency transmission, and logistical information regarding a mobile platform containing the mobile communication system.

* * * * *